United States Patent
Hampson et al.

(10) Patent No.: US 6,453,371 B1
(45) Date of Patent: Sep. 17, 2002

(54) METHOD, APPARATUS, AND SYSTEM FOR SELECTION OF A PORT FOR DATA EXCHANGE

(75) Inventors: Adam D. Hampson, Fremont; Steven C. Lemke, Sunnyvale; Daniel F. Chernikoff, Palo Alto; Bruce G. Thompson, South San Francisco; William C. Witte, Menlo Park, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/299,064

(22) Filed: Apr. 23, 1999

(51) Int. Cl.[7] .............................................. G06F 13/19
(52) U.S. Cl. ........................... 710/37; 710/9; 710/131; 709/203
(58) Field of Search ........................ 710/9, 37, 2, 131; 709/203

(56) References Cited

U.S. PATENT DOCUMENTS

| | | | | |
|---|---|---|---|---|
| 5,519,834 A | * | 5/1996 | Kammerman et al. | 395/200.06 |
| 5,727,202 A | * | 3/1998 | Kucala | 707/10 |
| 5,774,741 A | * | 6/1998 | Choi | 710/2 |
| 5,946,392 A | * | 8/1999 | Tague | 379/395 |
| 6,041,243 A | * | 3/2000 | Davidson et al. | 455/575 |
| 6,131,136 A | * | 10/2000 | Liebenow et al. | 710/131 |
| 6,178,469 B1 | * | 1/2001 | Hennessy et al. | 710/9 |
| 6,272,545 B1 | * | 8/2001 | Flanagin et al. | 709/227 |
| 6,285,890 B1 | * | 9/2001 | Panian | 455/557 |
| 6,330,618 B1 | * | 12/2001 | Hwkins et al. | 709/203 |
| 6,336,155 B1 | * | 1/2002 | Ito et al. | 710/37 |

* cited by examiner

Primary Examiner—Jeffrey Gaffin
Assistant Examiner—Abdelmoniem Elamin
(74) Attorney, Agent, or Firm—Van Mahamedi; Hickman, Palermo, Truong & Becker LLP

(57) ABSTRACT

Various embodiments of the invention provide for selection of a port in a portable computer as a pathway for exchanging data between the portable computer and an external data source. These embodiments can function with a variety of physical accessories, such as docking port cradles and modems, that connect the portable computer with apparatus that include an external data source.

Some of the embodiments provide methods that include the receiving of a request signal for data exchange, and determining whether the signal is from a physical accessory. If the signal is from a physical accessory, the portable computer exchanges data through the corresponding physical accessory. On the other hand, if the portable computer determines that the signal is not from a physical accessory, the portable computer exchanges data through a predetermined port, such as a default port, or a port specified by the user as a preferred port. Certain users exchange data at different times using different ports in conjunction with different physical accessories, but use only one exclusive port that does not connect to a physical accessory. Various embodiments of the invention assure that expectations regarding data exchanges for these users never fail due to an improper port selection, as long as the one exclusive port is selected as the preferred port.

27 Claims, 5 Drawing Sheets

METHOD, APPARATUS, AND SYSTEM FOR SELECTION OF A PORT FOR DATA EXCHANGE

CROSS REFERENCE TO RELATED APPLICATION

This application relates to and incorporates herein by reference as if fully set forth herein the following United States patent applications: Ser. No. 09/289,063 entitled "Detection of an Accessory Device Connected to a Portable Computer," filed, Apr. 23, 1999still pending, having inventors Eric M. Lunsford, Steven C. Lemke, Neal A. Osborn, and Francis J. Canova, Jr.; "Detection of an Accessory Device Connection Status," filed Apr. 23, 1999, having inventors Eric M. Lunsford, Steven C. Lemke, Neal A. Osborn, and Francis J. Canova, Jr.; and serial number 09/087,742, entitled "Method and Apparatus for Interacting with a Portable Computer," filed May 29, 1998now U.S. Pat. No. 6,300,996, having inventors Scott D. Lincke, Jeffrey C. Hawkins, and Joseph K. Sipher.

BACKGROUND OF THE INVENTION

1. Field of the Invention

The invention relates generally to the field of data exchange using a portable computer. More particularly, the invention relates to selection of a connection port for data exchange.

2. Discussion of the Related Art

The use of portable computers has grown dramatically in the past few years for a wide variety of applications. Conventional portable computers include lap-top computers and handheld computers. These portable computers typically include personal information management capabilities that include data, such as address list files and calendar files that are frequently updated by the user. Portable computers that include such information are also referred to as connected organizers when they can be connected to other data sources. Many portable computer users also use desktop computers or have access to other data repositories that manage data similar to the data carried in the portable computers.

The connected organizers are especially useful when the data stored in the portable computer can be easily synchronized with the data maintained in the other data repositories. This data synchronization is essential when the data can be modified by the user in two different changeable databases, such as one set of data disposed in the portable computer and another set of data disposed in one of the other data repositories. One method of synchronization, provided by U.S. Pat. No. 5,727,202, issued to Kucala on Mar. 10, 1998, reconciles two changeable databases with minimal user interaction. For example, the user can simply press a synchronization button on a docking port to cause the synchronization.

However, for some portable computers more than one physical path is available to exchange the data for synchronization between the portable computer and the other data repository. Conventional methods typically only work predictably with one pre-set physical pathway. The success of user attempts to synchronize using other pathways tends to be much less predictable, especially if the portable computer can use more than one port for a data exchange. The portable computer can exchange data for many purposes other than data file synchronization. For example, the data exchange can include the receipt of electronic mail, or exchanging data with an Internet service provider. For all of these data exchange applications, what is required, and not provided by the previous systems, is a solution that minimizes user input while assuring that the data is reliably and predictably exchanged between the portable computer and the other data repository using the port intended by the user, when more than one physical pathway is available for the data exchange.

SUMMARY OF THE INVENTION

Various embodiments of the invention provide for selection of a port in a portable computer as a pathway for exchanging data between the portable computer and an external data source. These embodiments can function with a variety of physical accessories, such as docking port cradles and modems, that connect the portable computer with apparatus that include an external data source.

Some of the embodiments provide methods that include receiving a request signal for data exchange, and determining whether the signal is from a physical accessory. If the signal is from a physical accessory, the portable computer exchanges data through the corresponding physical accessory. On the other hand, if the portable computer determines that the signal is not from a physical accessory, the portable computer exchanges data through a predetermined port, such as a default port, or a port specified by the user as a preferred port. Certain users exchange data at different times using different ports in conjunction with different physical accessories, but use only one exclusive port that does not connect to a physical accessory. Various embodiments of the invention assure that expectations regarding data exchanges for these users never fail due to an improper port selection, as long as the one exclusive port is selected as the preferred port.

A primary goal of the invention is to provide an improved user experience by minimizing the number of taps or button pushes needed to select a port for exchanging data. Another goal of the invention is to inform the user of which port is being used during the data exchange and which port was most recently used after the data exchange.

A first aspect of the invention is implemented in an embodiment that is based on a method for selecting a port for data exchange in a portable computer. A second aspect of the invention is implemented in an embodiment that is based on a portable computer capable of implementing the method for selecting a port for data exchange. A third aspect of the invention is implemented in a system for selecting a port for data exchange.

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The features illustrated in the drawings are not necessarily drawn to scale.

DETAILED DESCRIPTION

Figure 1:
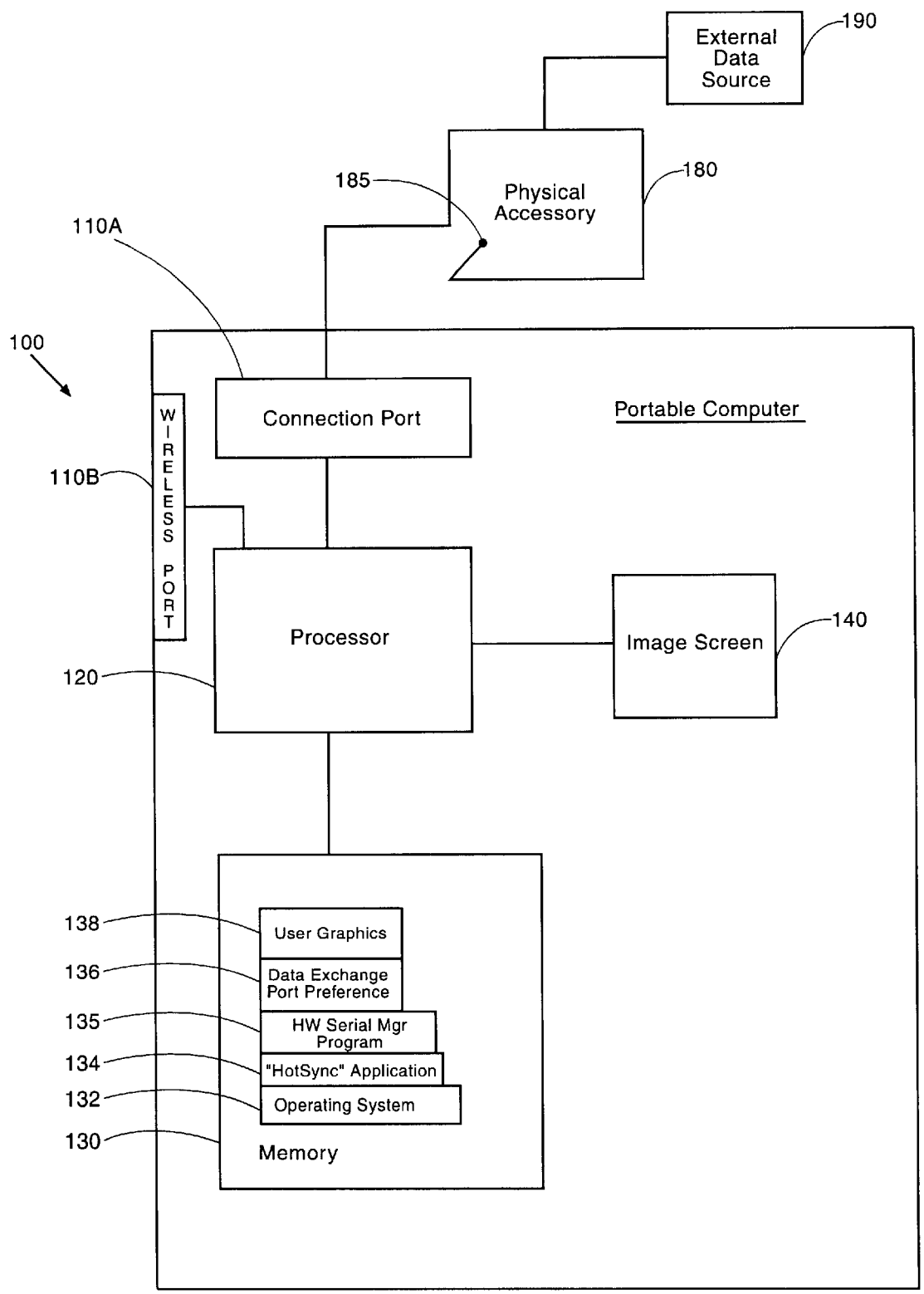
FIG. 1 illustrates a portable computer adapted to implement the connection port selection method, representing an embodiment of the invention.

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail. The term coupled, as used herein, is defined as connected, although not necessarily directly, and not necessarily mechanically.

Various embodiments of the invention provide methods, apparatus, and systems for selection of a port for data exchange in a portable computer. The port is selected as a pathway for exchanging data between the portable computer and an external data source.

The methods and apparatus function with a variety of physical accessories that connect the portable computer with apparatus that include an external data source. Examples of the physical accessories include docking port cradles and modems.

Some of the methods include the portable computer receiving a request signal for data exchange, and determining whether the signal is from a physical accessory. If the portable computer determines that the signal is from a physical accessory, the portable computer exchanges data through the corresponding physical accessory.

On the other hand, if the portable computer determines that the request signal is not from a physical accessory, the portable computer exchanges data through a predetermined port. The predetermined port can be a default port, or can be specified by the user as a preferred port.

The apparatus and methods provide an improved user experience for those users that exchange data at different times and different locations using different ports. The use of the physical accessory for the data exchange in response to the signal, ensures that the data exchange will proceed as expected by the user even if the default, or preferred, port setting differs from the port corresponding to the physical accessory. Also, if only one particular port that does not connect to a physical accessory is used, the preference can be set a single time and the user expectations regarding data exchanges will never fail due to an improper port selection.

The portable computer can be a Palm IIIx™ connected organizer that has an IrCOMM capable infrared communications port as the preferred port, and a "HotSync" data exchange application. If the user sets the preferred port to the infrared communication port, the user can still initiate "HotSync" operations by pressing hardware buttons on physical accessories connected to the Palm IIIx. The physical accessories can be modems and communication cradles. The button presses will not change the port preference because the request signal provided by the button includes information that the portable computer can match with the type of physical accessory from which the signal came, and consequently override the port preference. The matching of the signal with the physical accessory type is described in United States patent application serial number 09/299,063, entitled "Detection of an Accessory Device Connected to a Portable Computer," filed Apr. 23, 1999still pending, and having inventors Eric M. Lunsford, Steven C. Lemke, Neal A. Osbom, and Francis J. Canova, Jr. which is incorporated herein by reference.

When desired, the user can initiate infrared "HotSync" operation by tapping a graphics button. The graphics button for "HotSync" initiation is displayed by the "HotSync" program on the portable computer's touch-sensitive image screen. If the infrared port is the only port used for "HotSync" operations that does not correspond to a physical accessory capable of providing a signal with identifying information, the user never has to reset the port preference after a hardware button initiated HotSync. Therefore, the user can be most assured that no attempted "HotSync" operations will fail due to an improper communication port selection.

Portable Computer for Selection of a Port for Data Exchange

Various embodiments of the invention include a portable computer having more than one port for exchanging data with other sources of data. The exchange of data can include transferring synchronization data for a number of applications, such as an address list file and a calendar file, in a connected organizer.

The components of some of these embodiments are represented in the portable computer 100 shown in FIG. 1. The portable computer 100 includes a connection port 110A, a wireless port 110B, a processor 120, a memory 130, and an image screen 140. The memory 130 includes an operating system 132, a "HotSync" application 134 or other data exchange application, and a hardware serial manager program (HWSerialManager) 135. The "HotSync" application 134 and the HWSerialManager program 135 include user graphics 138, and the HWSerialManager program includes a data exchange port preference 136 program.

FIG. 1 also shows a physical accessory 180 including a data exchange connection button 185, and an external data source 190. The physical accessory 180 is connected to the external external data source 190 and the connection port 110A. The connection port 110A, the wireless port 110B, the image screen 140, and the memory 130 are coupled to the processor 120.

Some embodiments of the portable computer 100 include a palm-sized connected organizer having enhanced-infrared communications capability such as the Palm IIIx™ from 3Com, Palm Computing. The portable computer can have one or more connection ports 110A and one or more wireless ports 110B.

Some of the connection ports 110A include multipin connectors. For example, the connection port 110A can be a ten pin multipin connector with one pin available to connect the processor 120 with signals received from the "HotSync" connection port button 185. The connection ports 110A can be adapted to couple with modems or docking port cradles. The connection ports 110A can be adapted to support serial communication, e.g., RS-232, RS-422, RS-423, or V.35 interface, parallel communications, e.g., Centronics, enhanced parallel port (EPP), or small computer system interface (SCSI) interface, universal serial bus (USB), IEEE 1394 (firewire) or other communication bases.

The wireless port 110B can be an infrared port adapted to emulate parallel port and serial port communications, or a radio frequency port. For some embodiments both the RF and the IR ports are provided. The infrared (IR) port can be adapted to perform serial and parallel communications using IrDA and IrCOMM protocols. The radio frequency wireless port can be adapted to exchange data according to paging system protocols or cellular phone protocols, or to perform serial communications using a protocol conforming to specifications provided by the Bluetooth consortium.

The IrCOMM protocol is published by the Infrared Data Association[SM]. IrCOMM provides emulation of serial and parallel ports over the Infrared Link Management Protocol/Infrared Link Access Protocol (IrLMP/IrLAP) protocol stack. The emulation enables users to exchange data with existing printing and communication applications, using standard application program interfaces (APIs), and using the infrared communication channel as a serial or a parallel port.

For portable computers 100 with an IrCOMM capable port, additional features are required to ensure that the port intended by the user to be employed for the data exchange will be selected for use by the data exchange application. Various embodiments of the invention provide such features while requiring minimal user input to ensure that the user expected data exchange port is used. In some embodiments, the ports available in the portable computer 100 include an IrCOMM capable port, a modem connection port, and a cradle connection port. The modem and cradle can share the same physical connection port.

The processor 120 can be a personal systems embedded processor such as a DragonBall™-EZ (MC68EZ328). The memory 130 can be the primary memory of the portable computer 100, and for connected organizers typically has a storage capacity in range of approximately 1 megabyte to approximately 8 megabytes. The connected organizers available from Palm Computing, Inc. include the Palm III™, which has 2 megabytes of memory storage capacity, and the Palm IIIx, which has 4 megabytes. However, the processor type and memory size are not particularly important. All that is needed is processing circuitry and storage circuitry sufficient to perform the data exchange functions.

The operating system 132 can be the PalmOS operating system, or any other operating system adapted for use by a portable computer 100, such as Linux, Windows®98, or Windows® CE.

The "HotSync" application 134 is included in various embodiments of the invention, specifically the Palm IIIx and other portable computers from Palm Computing. More generally, the invention is operable in conjunction with any program that provides for data exchange between the portable computer 100 and one or more external data sources 190.

The HWSerialManager program 135 is also provided in various embodiments of the invention, specifically the Palm IIIx and other portable computers from Palm Computing. More generally, the invention is operable in conjunction with any program that provides the user with the ability to select a preferred port for data exchange using software. The data exchange port preference 136 program typically provides an input field displayed in user graphics 138. The user graphics 138 include a pop-up list for the data exchange port preference 136 selection. The data exchange port preference 136 selection graphics can be displayed by the HWSerialManager program 135, or by the corresponding data exchange program. The user graphics 138 provided by the HWSerialManager program 135 are described in the Graphic User Interfaces section below.

The image screen 140 is typically a touch-sensitive liquid crystal diode (LCD) screen such as those provided on the Palm III and the Palm IIIx.

The physical accessory 180 can be a modem, a docking port cradle, or any other accessory capable of providing a signal to the port including an indication of the type of accessory. The "HotSync" button 185 is provided on physical accessories 180 adapted to exchange data with connected organizers from Palm Computing. More generally, the invention is operable with physical accessories that provide an indication of the physical accessory type to the portable computer. Typically, the indication of physical accessory 180 type is provided with a request for data exchange.

The signal can be generated by a variety of input mechanisms. Preferably, to enhance the user experience by minimizing the number of user actions needed to initiate an exchange of data, the signal is generated by a single interaction with an input mechanism disposed on the physical accessory 180. The single interaction can include a specified movement for a push-activated switch, a rotation actuated switch, a slide activated switch, or any other activation mechanism. In some embodiments, the single interaction can include placing the connection port 110A in physical contact with the physical accessory 180, for example by dropping the Palm IIIx into a communications cradle.

The external data source 190 can be disposed in a desktop computer, a printer, a set-top box, a wireless base station, a network connected device, or other data processing device. For synchronization applications, the external data source 190 and the portable computer 100 each contain versions of corresponding files.

The portable computer 100 provides users with a clear selection for specifying which of the communications ports will be used for exchanging data with a graphic user interface (GUI) displayed on the image screen 140. The data exchange application can be used to select the port. For portable computers from 3Com, Palm Computing, the "HotSync" application displays the port selection GUI. A user can select the port by tapping the touch-sensitive screen on the GUI corresponding to the desired port. In some embodiments, the user can select the desired port by entering input via a keyboard or keypad.

The portable computer 100 is adapted to interpret physical accessory 180 data exchange initiation button signals to determine which type of physical accessory corresponds to the signal. This capability enables the user to set the software connection port preference so that very few, if any, changes to the preference are required for the user to successfully perform a data exchange operation.

The portable computer 100 typically includes a battery source (not shown). The battery source internally powers the microprocessor 120 and memory 130, as well as other electrical components within the portable computer 100. The battery source can be standard disposable batteries or a rechargeable battery, such as a lithium battery. The portable computer 100 can also include at least one connection port 110A having a pin connector for coupling to a mating pin connector of the communication (docking port) cradle, modem or other physical accessory 180.

The processor 120 can extend a signal line to a pin element of the pin connector. The portable computer 200 and the communication cradle can electrically connect using only some of the pin elements of the respective pin connectors. For example, the connection port 110A can include a ten pin male connector, where nine pins are designated for functions such as parallel data transfer, parity, and data exchange functions for coupling the portable computer 100 with another computer. One remaining pin is available for coupling without affecting the remaining pins.

According to various embodiments of the invention the available pin is coupled to the signal line. In one configuration, the signal line and the available pin are initially pulled high using a pull-up resistor. When the pin connector is mated to electrically connect with the communication cradle, the pin and signal line are pulled low. The change in voltage on the signal line signals the processor 120 that an electrical connection between the communication cradle and the portable computer 100 is established.

In some embodiments of the invention, a change in voltage on the signal line can signal the processor 120 to alter a portion of a program and execute alternate code. The portable computer 100 can include a switch to alternatively allow the user to selectively override the normal behavior of the program function when the communication cradle is active. The portable computer 100 can also detect the change in the voltage on the signal line for the purpose of informing the user that the communication cradle, or any other physical accessory 180, is actively coupled to the portable computer.

For portable computers 100 communicating with only two physical accessory 180 types, the detection can be accomplished using a transistor-transistor logic (TTL) logic high or low from the accessory type indication pin. The processor 120 can extend a signal line to the accessory type indication pin.

Various embodiments of the invention enable the user to accomplish either a modem data exchange, or a communication cradle data exchange, after an infrared preference has been set in the port manager program or other application program interface (API). The modem or communication cradle data exchange occurs automatically, without the user having to reset the preference each time the user attempts to exchange data using a communication port different than the preferred port. In some embodiments, such as the Palm IIIx, the program for setting the port preference is a hardware serial manager, such as the HWSerialManager program 135 shown in FIG. 1.

The data exchange request can be provided by the pressing of a hardware button on the particular physical accessory used for the data exchange. The data exchange request can also be provided by the activation of a data exchange program on the device in which the external data source 190 resides. Using the analog voltage signal discussed below in portable computer examples 2 and 3, the processor 120 provides an indication to the data exchange application that the port preference setting therein (e.g., for the infrared port) will be temporarily overridden for this particular data exchange as a consequence of the matching of the analog voltage level with a known physical accessory 180.

Other signals can also temporarily override the port preference. For example, an interrupt signal resulting from an antenna movement used to initiate RF communication movement interrupt, including the interaction with the processor 120 is described in more detail in U.S. patent application Ser. No. 09/087,742, which is incorporated herein by reference as if fully set forth herein.

The key advantage of this scheme for the Palm IIIx is that if the user is going to use the IR port for data exchange, then once the user sets the preference to IR the preference can be left alone. The user only has to do a one-button push to accomplish synchronization using the IR port, or over the other alternative connection ports that have analog voltages listed in the look up table. The user does not have to reconfigure the port preference to accomplish this. Only a single button press is required from power-on to synchronization. This advantage is available for any portable computer 100 that includes the appropriate elements as described herein.

For other embodiments, the portable computer 100 can receive an analog signal between the TTL high and low values. These embodiments are more fully described in United States patent application Ser. No. 09/299,063, entitled "Detection of an Accessory Device Connected to a Portable Computer," filed Apr. 23, 1999, having inventors Eric M. Lunsford, Steven C. Leinke, Neal A. Osborn, and Francis J. Canova, Jr. which is incorporated by reference as if fully set forth herein. The analog signal indicates that the data exchange is going to take place using a physical accessory associated with the analog signal level received by the processor 120. Different voltage levels can be established for data exchange request signals from different physical accessory 180 types. A comparator within an A/D converter disposed in the portable computer 100 compares the voltage on the signal line with the reference voltage supplied from a battery source. The A/D converter can signal the memory 130 for the purpose of matching the voltage on the signal line with a type of physical accessory 180.

In other embodiments, the physical accessory 180 includes a voltage divider, and an outlet port for mating with the portable computer 100. The battery source feeds the reference voltage to both the A/D converter and to the input of the voltage divider. In this way, the voltage on the output node can be adjusted to account for fluctuations to the reference voltage supplied to the A/D converter. This enables the A/D converter to more accurately detect the voltage on the output node.

Method for Selection of a Port for Data Exchange

Figure 2:
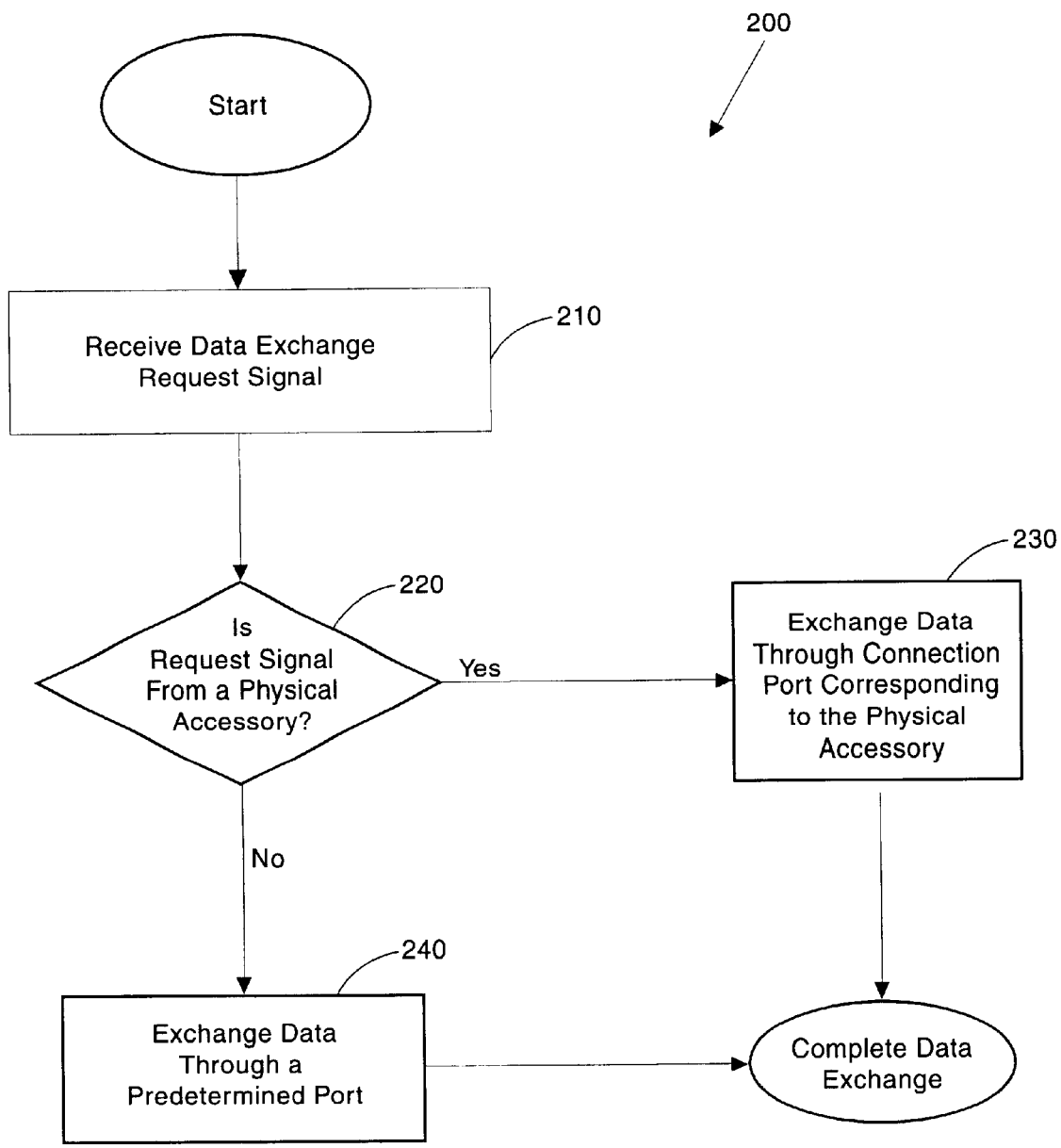
FIG. 2 illustrates a method for selection of a port for data exchange.

Various embodiments of the invention include a data exchange port selection method 200, as illustrated in FIG. 2. The port selection method 200 is typically implemented in a portable computer 100. The port selection method 200 can include the portable computer 100 receiving a request signal for data exchange (block 210), determining whether the request signal is from a physical accessory 180 (block 220), exchanging data through a connection port 110A corresponding to a physical accessory 180 (block 230) if the request signal is from the physical accessory, and exchanging data through a predetermined port (block 240) if the request signal is not from a physical accessory.

The data exchange can include synchronization of data stored in a file in the portable computer 100 with data stored in a file disposed in an external data source 190, such as performed by a "HotSync" operation for a Palm III computer. The synchronization can include reconciling and updating of the file data. The file data can include at least one of address list file items and calendar file items.

The "HotSync" operation can be initiated using a software button displayed by the "HotSync" application 134, or by pressing a "HotSync" hardware button 185. The "HotSync" hardware button 185 can be disposed on a communications cradle, a modem, or another physical accessory 180. Other data exchanges can also be initiated by a hardware button on a corresponding physical accessory, a hardware or software button disposed on the portable computer 100, or a hardware or software button disposed on the device in which the external data source 190 resides.

The exchanging of data through a connection port 110A corresponding to a physical accessory 180 (block 230) can include the processor 120 overriding the selection of the predetermined port as the preferred port. The request signal for data exchange can include an indication of an accessory type corresponding to the physical accessory 180. The overriding can include the portable computer 100 determining from the indication of the accessory type the port corresponding to the physical accessory 180.

The overriding ensures that the data exchange is performed in the manner indicated by user interaction with a corresponding user interface (e.g., pressing the cradle, modem, or software data exchange button). Relying on the user interaction to inform the selection of the data exchange port minimizes the occurrence of failed data exchange attempts. Such failed attempts can occur for alternate solutions that assume that the user has correctly set up the data exchange application port preferences and ignore subsequent user interactions with physical accessories 180. Ensuring that the selected data exchange port relates to the user interaction greatly reduces user frustration and confusion that can arise when an expected data exchange does not occur.

Various embodiments of the port selection method 200 also reduce the number of taps required to perform a HotSync operation or another data exchange operation. For example, a port selection screen can be displayed by the HotSync application 134. If the port selection screen identifies the software preference for the data exchange port, the user does not need to make a separate request to check the currently set software preference. As discussed below in the Graphic User Interfaces section, the "HotSync" direct connection picker 318 indicates the preferred port on the "HotSync" software initiation screen 310.

One problem solved by various embodiments of the invention can arise when a user presses the "HotSync" hardware button 185 to cause the portable computer 100 to synchronize through a different port (e.g., modem or cradle) than is currently specified in the "HotSync" application 134. The problem is that, unless otherwise directed, the "HotSync" application 134 will attempt to exchange data using the port indicated in the software preferences, even if the user's subsequent action, e.g., pressing the "HotSync" hardware button 185, indicates that the user expects a different result. Some embodiments of the invention solve this problem by determining which port to direct the "HotSync" data exchange by applying the following algorithm.

1. If the "HotSync" operation is initiated by pressing the software button in the "HotSync" application 134, then use the port specified by the "HotSync" application preferences.

2. If the "HotSync" operation is initiated by pressing the "HotSync" hardware button 185 on the attached physical accessory 180, then determine which physical accessory 180 type is attached to the portable computer 100 by examining the register bits, e.g., based on the matching of the voltage signal, provided to the processor 120 via the connection port 110A. The voltage signal informs the "HotSync" application 134 that an identified connection port 110A is the source of the voltage signal because only that connection port is used to connect the corresponding type of physical accessory 180 to the portable computer 100.

3. If the identified connection port 110A is different from the software-selected port, switch over the "HotSync" application 134 to use the identified connection port 110A.

4. Once the "HotSync" operation is complete, switch the "HotSync" application's 134 preference back to the port defined by the software preferences prior to the "HotSync" operation.

5. Indicate on the image screen 140 the port used for the "HotSync", both during the "HotSync" operation, and after the completion of the "HotSync" operation, thereby conforming the user expectations of regarding the data exchange port.

6. If a failure occurs, then provide an error message to indicate the failure mode.

According to this algorithm, only one step is required from off to synchronization for connection ports 110A having analog signals listed in the memory 130.

For some embodiments of the invention, interacting with a data exchange initiation mechanism on the physical accessory 180 sends a request for data exchange to the portable computer 100. For the Palm III, pressing the "HotSync" hardware button 185 disposed on the physical accessory 180 used to initiate a "HotSync" sends a "HotSync" initiation signal to the Palm III. The Palm III processor 120 receives the "HotSync" initiation signal. Receiving the "HotSync" initiation signal wakes the processor 120, and starts the "HotSync" application 134 disposed in the Palm III memory.

"HotSync" operations using a physical accessory 180 that does not provide a "HotSync" initiation signal, such as certain travel cables, require user input into the HWSerialManager program 135 to configure synchronization parameters appropriately to ensure that the data is formatted for exchange via the physical accessory.

Various embodiments of the port selection method 200 accommodate the developments associated with the IrCOMM protocol. The port selection method 200 can be used for data exchanges between the portable computer 100 and any other device that has IrCOMM capability.

Other embodiments of the invention provide a method to accommodate the developments associated with radio frequency (RF) communications preformed according to protocols provided by the Bluetooth consortium. For example, such RF communications can be performed in the 2.4 GHz Industrial-Scientific-Medical (ISM) band, and use frequency hopping spread spectrum (FHSS) techniques. For some of the embodiments, the object exchange (OBEX) upper layer protocol is used to implement the wireless communications capability.

Method Example

Without the features described herein, problems can occur when a portable computer 100 provides two or more choices of ports for data exchange. These problems are most troublesome when the user employs more than one of the ports on different occasions, and forgets to set the data exchange application port preference accordingly. Various embodiments of the invention minimize the risk of this problem by interpreting data exchange initiation request signals from physical accessories 180 to determine which type of physical accessory 180 provided the signal. The physical accessory type 180 is connected exclusively through a particular data exchange port disposed on the portable computer 100.

In one example of this problem, a user selects the IR port as the preferred port using a program, such as the "HotSync" application 134. The portable computer 100 completes the data exchange for which the IR port was selected. After the data exchange is completed, the IR port preference is retained in the data exchange application.

If the user then attempts to use the cradle for a data exchange without resetting the port preference, no data exchange will occur unless the port preference is ignored by the data exchange program. Instead, the portable computer 100 will unsuccessfully attempt to transmit data, and be ready to receive data, through the IR port; while data exchange from and to the external data source 190 will be unsuccessfully attempted through the communication cradle.

The attempted data exchange through the cradle will be unsuccessful because the connection request will be attempted from the portable computer 100 through the IR port instead of through the RS-232 port connected to the external data source 190. Also, the application program interface for the data exchange application will not be set to exchange the data with the cradle because a different data protocol must be used for the cradle versus the IR connected data source. Therefore, no data exchange will actually occur because the port preference remains set for the IR port from the previous data exchange. The failure to exchange data falls well short of user expectations.

A warning or an error message can inform the user of the failure to complete the data exchange. For example, the data exchange application can include a list of previously used ports for data exchange, including ports corresponding to attempted data exchanges that were not successfully completed. However, a preferred solution minimizes the occurrence of this type of error rather than merely reporting the error, or warning the user about the error.

Various embodiments of the invention minimize the risk of this failure mode by taking advantage of information provided by signals from the physical accessory to adequately meet the user's expectations of a successful data exchange. For some embodiments, the signal provided by the physical accessory can be generated by a pressing of a button disposed on the physical accessory.

Graphic User Interfaces for Specification and Selection of Preferred Port

Various user graphics 139 can be displayed by the "HotSync" application 134 and the HWSerialMgr program 135, or corresponding programs for other data exchange operations. Some embodiments of the user graphics are shown in FIGS. 3A through 3F, 4, 5A, and 5B.

Figure 3A:
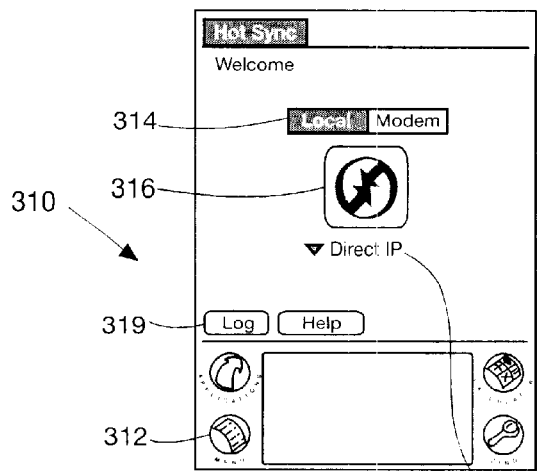
FIG. 3A illustrates a screen display for a HotSync™ software initiation using a direct infrared port, representing an embodiment of the invention.

FIG. 3A shows a "HotSync" software initiation screen 310 using a direct infrared port displayed by the "HotSync" application 134. The portable computer 100 includes a system menu request icon 312, that is disposed below the software initiation screen in the PalmIIIx. The "HotSync" software initiation screen 310 includes a pair of "HotSync" mode buttons 314, a single "HotSync" software initiation button 316, a "HotSync" direct infrared connection picker 318, and a log button 319. Tapping the system menu request icon 312 causes the options pop-up menu 365 to be displayed on the image screen 140, as shown in FIG. 3F. Note that tapping on the connection setup 368 item on the options pop-up menu 365 results in the displaying of connection preferences screen described below.

The "HotSync" mode buttons 314 appear as radio buttons and enable the user to select between a modem synchronization and a local synchronization. Tapping on "Local" or "Modem" switches into the indicated "HotSync" mode, and changes the screen to display parameters unique to the indicated mode, e.g., the modem initiation string for the phone number that is set to be dialed to contact the network node corresponding to the modem. The "HotSync" mode button 314 can be set for a connection mode that does not relate to a physical accessory 180 capable of transmitting a data exchange request signal that includes an indication of an accessory type. If the user employs only one non-indicating port for data exchange; then, in order to minimize the need to reset the port preference, that non-indicating port should be selected as the preferred port. The selection of the port can then be essentially automatic, as the user will not have to reset the preferred port.

The "HotSync" software initiation button 316 causes the "HotSync" application 134 to begin a "HotSync" operation including exchanging data through the predetermined port (block 240, in FIG. 2). The predetermined port can be selected using the HWSerialMgr program 135 using the connection preferences panel user graphics 138 described below in conjunction with FIG. 4.

The "HotSync" direct connection picker 318 shows the currently selected connection from the connection preferences panel as provided by the "HotSync" application 134. FIG. 3A shows the "HotSync" connection picker 318 for a Direct IR connection. The Direct IR connection can be accomplished using an IrCOMM capable port.

Selection of the log button 319 can cause the display of the results of the most recently completed synchronization, including that of an attempted synchronization that was not successfully completed.

Figure 3B:
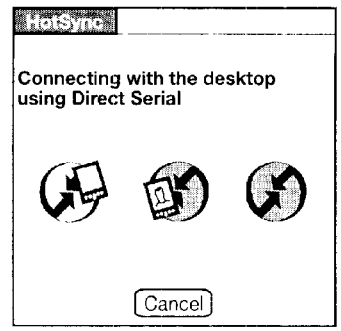
FIG. 3B illustrates a screen display indicating that a direct serial connection port connected to a cradle is in use for a "HotSync" data exchange.

FIG. 3B shows that once the Palm III is placed in the communications cradle and the "HotSync" hardware button 185 is pushed, the portable computer 100 automatically switches from the direct IR preference shown in FIG. 3A and performs a "HotSync" operation through the communications cradle.

Figure 3C:
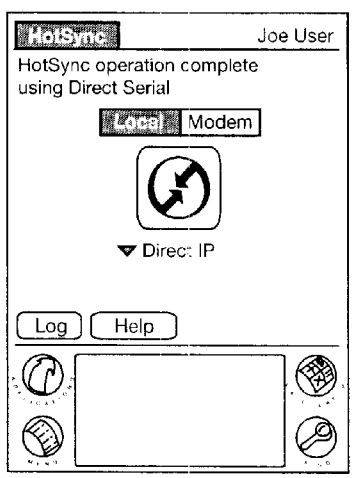
FIG. 3C illustrates a screen display indicating that after the "HotSync" data exchange is complete, and that software preference for a direct infrared port is maintained by the "HotSync" application.

FIG. 3C shows that after the communication cradle "HotSync" operation has been completed, the "HotSync" application 134 maintains the software preference of the direct IR connection as the preferred port for the next "HotSync" operation.

Figure 3D:
FIG. 3D illustrates a screen display indicating that a direct infrared port is in use for "HotSync" data exchange.

FIG. 3D shows that a tapping of the "HotSync" Software initiation button 316 on the image screen 140 causes the "HotSync" operation to proceed using the IR port on the Palm IIIx.

Figure 3E:
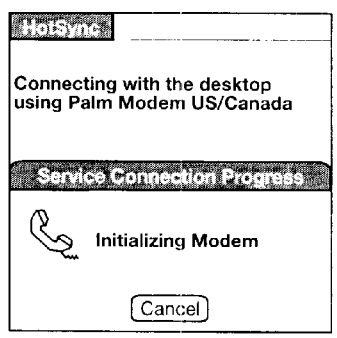
FIG. 3E illustrates a screen display indicating that a modem connection is being initialized for "HotSync" data exchange.
Figure 3F:
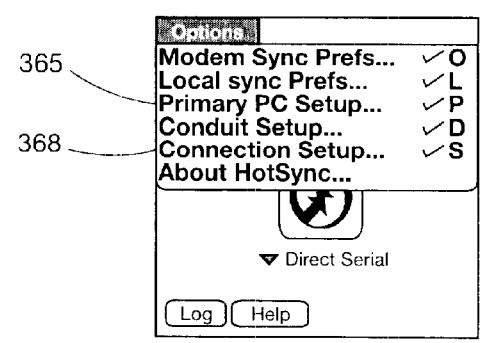
FIG. 3F illustrates a screen display including a "HotSync" options pop-up list.

FIG. 3E shows the start-up of the "HotSync" application, again with the direct IR port selected as the preferred port. If the "HotSync" operation is initiated by pressing the "HotSync" hardware button 185 on a modem, the portable computer 100 automatically switches from the default of the direct IR port to do a HotSync through the modem port, and the image screen 140 displays the initializing modem/service connection in progress message.

FIG. 3F shows the options pop-up menu 365 that is displayed when a user taps the system menu request icon 312. The options pop-up menu 365 includes a connection setup option 368 that brings up the connection preferences screen discussed below.

Figure 4:
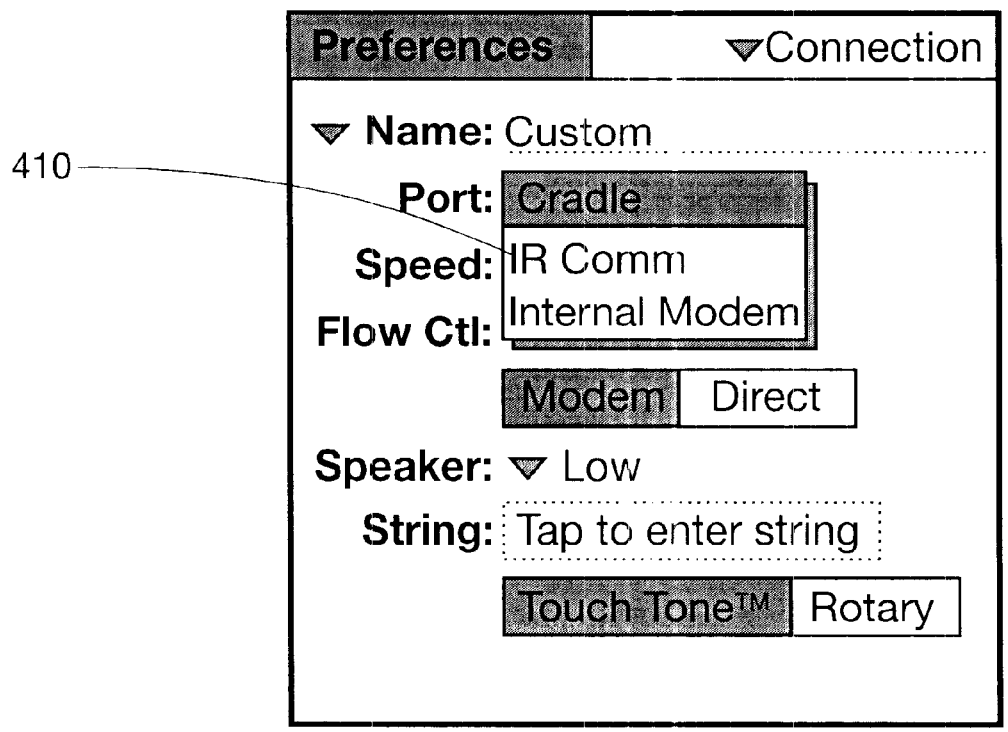
FIG. 4 illustrates a connection preferences screen display including a port pop-up list.

FIG. 4 shows a connection preferences screen including a port pop-up list. This screen is displayed by the HWSerial- Manager program 135. The port pop-up list 410 includes the communication cradle port, the IR Comm port, and the internal modem port.

Figure 5A:
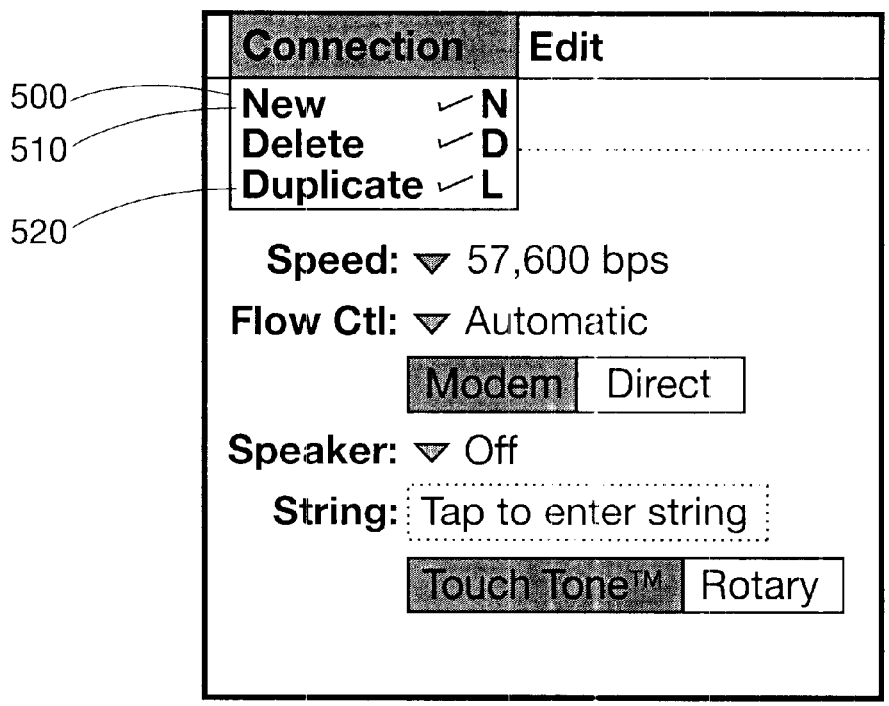
FIG. 5A illustrates a connection preferences screen display including an edit popup list.

FIG. 5A shows a connection preferences screen including an edit pop-up list. The edit pop-up list 500 includes a "New" edit selection 510 and a "Duplicate" edit selection 520 for specifying new connections for data exchange.

Figure 5B:
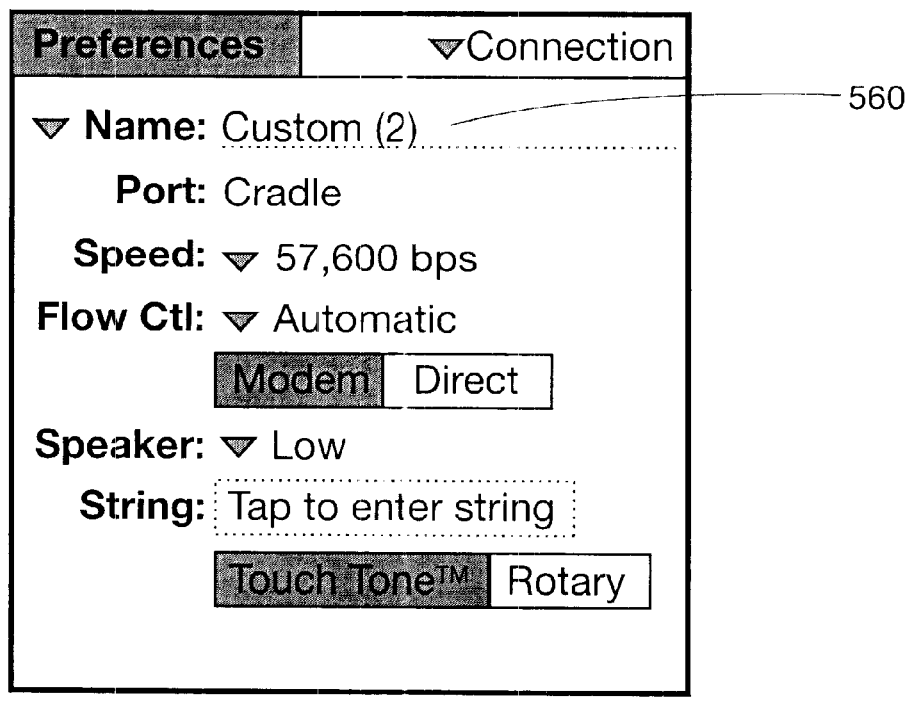
FIG. 5B illustrates a connection preferences screen display for adding a new connection for data exchange.

As shown in FIG. 5B, tapping the "New" edit selection 510 option results in the appearance of a "Custom" string in the connection name field 560 and creates a new connection preference. Tapping the "Duplicate" edit selection 520 also results in the appearance of a "Custom" string in the connection name field 560, but the predefined parameters of the previous connection set up are duplicated in the new preference just created.

System for Automatic Selection of Connection Ports

Various embodiments of the invention provide a system for selecting a port for data exchange. The system includes data sources, one or more physical accessories 190, and portable computers 100. In some embodiments, the data sources can be a desktop computer, a second portable computer, or a server disposed in a network.

Each of the physical accessories 190 is coupled with one or more of the data sources and includes an accessory port, and an input mechanism adapted to transmit a request signal for data exchange. The input mechanism can be a "HotSync" hardware button. In some embodiments, one or more of the physical accessories 190 can include devices selected from a group consisting of a communication cradle, a modem, a universal serial bus device, and a parallel communication port.

Each of the portable computers 100 includes a plurality of ports, a program adapted to respond to the request signal for data exchange, and a processor 120. Each of the ports is adapted to provide a pathway for exchanging data with the data sources.

The program is adapted to respond to the request signal for data exchange by exchanging data with at least one of the data sources, and identify a preferred port for exchanging data. The program can be the "HotSync" application 134.

The processor 120 is adapted to detect a request signal for data exchange from a physical accessory 190 connected to the portable computer 100. The request signal includes an indication of an accessory type corresponding to the physical accessory 190. The program is coupled with the processor 120 to respond to the request signal including an indication of an accessory type by causing the portable computer 100 to exchange data through the physical accessory 190, and respond to the request signal not including an indication of an accessory type by causing the portable computer to exchange data through the preferred port.

In some embodiments, at least one of the physical accessories 190 includes a multi-pin connector having an output node. For these embodiments, at least one of the portable computers 100 includes a comparator and a signal line. The signal line is adapted to couple to the output nodes of the at least one of the physical accessories. The signal line is also coupled with the comparator to determine a voltage provided by a corresponding output node, the voltage corresponds to an accessory type.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended sub-claims.

What is claimed:

1. A method for selecting a port for data exchange in a portable computer, the method comprising:
   receiving a request signal for data exchange;
   determining if the request signal corresponds to a request for data exchange from a physical accessory;
   if the request signal corresponds to a request for data exchange from the physical accessory, then overriding a previous designation of a predetermined port and selecting to exchange data through a connection port to the physical accessory; else
   exchanging data through the predetermined port in response to receiving the request signal.

2. The method of claim 1, identifying the predetermined port through a data exchange program.

3. The method of claim 2, wherein the data exchange is adapted to perform data synchronization, and the method includes reconciling and updating data stored in the portable computer with data stored in a corresponding external data source using the data synchronization program.

4. The method of claim 3, wherein reconciling and updating data stored in the portable computer includes updating and reconciling items from at least one of address list file items and calendar file items.

5. The method of claim 2, including displaying, during the data exchange, information indicating the port used for the data exchange.

6. The method of claim 2, including displaying, after the data exchange, information indicating the port used for the data exchange.

7. The method of claim 1, wherein overriding a previous selection of a predetermined port and exchanging data through a connection port of the physical accessory includes a processor overriding the previous selecting of the predetermined port for the connection port.

8. The method of claim 7, wherein:
   receiving a request signal for data exchange includes identifying from the request signal an indication of an accessory type corresponding to the physical accessory; and
   overriding a previous selection of a predetermined port includes determining from the indication of the accessory type the connection port corresponding to the physical accessory.

9. The method of claim 1, further comprising previously selecting the predetermined port as a preferred port using a selection graphic, the selection graphic displayed by a program for selection of a connection.

10. The method of claim 1, further comprising exchanging data on the portable computer with an external data source, including transferring data using one of: infrared transmission, radio frequency, wireless transmission, a direct serial port, a direct parallel port, and a modem.

11. The method of claim 1, including exchanging data through the predetermined port by interacting with a user interface provided by a program for data exchange.

12. The method of claim 1, wherein determining if request signal corresponds to a request for data exchange includes determining if the request signal is from one of a modem and a docking port.

13. The method of claim 1, wherein:
exchanging data through the predetermined port includes exchanging data through a previously selected port selected from one of an infrared communication port, a modem port, a port adapted for serial communications, a port adapted for parallel communications, and a port adapted for radio frequency communications.

14. A portable computer, comprising:
a plurality of ports configured to exchange data;
a processor adapted to:
detect a request signal for data exchange from a physical accessory connected to the portable computer,
identify an accessory type corresponding to the physical accessory if the request signal includes an indication of the accessory type; and
if the request signal includes the indication of the accessory type, respond to the request signal by causing the portable computer to exchange data through the physical accessory; else
if the request signal does not include the indication, respond to the request signal by causing the portable computer to exchange data through a previously designated preferred port.

15. The portable computer of claim 14, including an image screen, wherein the processor is configured to display a user interface on the image screen, including a port picker graphic for designating the preferred port.

16. The portable computer of claim 14, wherein the processor is configured to identify the accessory type from the indication of the request signal, and in response to identifying the accessory type, execute a data exchange program and alter portions of the program according to the accessory type.

17. The portable computer of claim 16, wherein:
further comprising a memory to store a look-up table that associates individual physical accessories in a first group to voltage levels of the request signal.

18. The portable computer of claim 14, including:
an image screen; and
the processor being configured to display graphic user interface elements in order to prompt a user to designate the preferred port.

19. The portable computer of claim 18, wherein the processor is configured to display the graphic user interface elements in a connection panel, the connection panel includes graphic user interface elements for selecting:
one of the types of physical accessories for exchanging data, and a type of connection for exchanging data; and
the speed of the data exchange.

20. The portable computer of claim 19, wherein the processor is configured to identify the accessory type from the indication of the request signal, responsive to the type of physical accessory being identified as a modem, the connection panel including a string graphic element corresponding to a value that enables a user to gain access to a source of data with which the portable computer exchanges data.

21. The portable computer of claim 19, wherein the processor is configured to display the connection panel providing an edit capability which is selectable to specify additional types of physical accessories for selection as preferred connections, and add the additional types to the connection panel.

22. The portable computer of claim 14, wherein the plurality of ports include at least one infrared port adapted to exchange packet data.

23. The portable computer of claim 22, wherein the infrared port is adapted to exchange packet data formatted according to an Infrared Link Management Protocol and according to an Infrared Link Access Protocol.

24. The portable computer of claim 14, wherein the plurality of ports include at least one of an internal modem, a mode port, a serial port, a parallel port, an infrared port adapted to exchange packet data directly with another infrared port, and an infrared port adapted to exchange packet data through a modem.

25. The portable computer of claim 14, wherein the processor is configured to execute a data synchronization program adapted to reconcile and update data stored in the portable computer with data stored in a corresponding external data source.

26. The portable computer of claim 14 including a memory wherein:
at last one of the ports is adapted to couple with the physical accessory, the physical accessory is adapted to connect the portable computer to at least one external data source.

27. The portable computer of claim 14, wherein the processor is configured to process the request signal to identify an indication that the physical accessory is actively coupled to the portable computer and is actively coupled to at least one external data source connected to the physical accessory.

* * * * *